US012749610B2

(12) United States Patent
Nakajima et al.

(10) Patent No.: US 12,749,610 B2
(45) **Date of Patent: *Sep. 29, 2026**

(54) MAGNETIC BASE BODY CONTAINING METAL MAGNETIC PARTICLES AND COIL COMPONENT INCLUDING THE SAME

(71) Applicant: TAIYO YUDEN CO., LTD., Tokyo (JP)

(72) Inventors: Takashi Nakajima, Tokyo (JP); Keiko Yajima, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 18/945,170

(22) Filed: Nov. 12, 2024

(65) Prior Publication Data

US 2025/0069793 A1 Feb. 27, 2025

Related U.S. Application Data

(63) Continuation of application No. 17/361,797, filed on Jun. 29, 2021.

(30) Foreign Application Priority Data

Jun. 30, 2020 (JP) ................................ 2020-113176

(51) Int. Cl.
*H01F 27/255* (2006.01)
*H01F 27/32* (2006.01)

(52) U.S. Cl.
CPC .......... *H01F 27/255* (2013.01); *H01F 27/32* (2013.01)

(58) Field of Classification Search
CPC ........ H01F 1/14766; H01F 1/24; H01F 17/04; H01F 17/045; H01F 27/255; H01F 27/32
See application file for complete search history.

(56) References Cited

U.S. PATENT DOCUMENTS

| | | | |
|---|---|---|---|
| 2010/0044618 A1 | 2/2010 | Ishimine | |
| 2018/0308629 A1 | 10/2018 | Shinohara | |
| 2021/0118602 A1 | 4/2021 | Tsuchiya | |

FOREIGN PATENT DOCUMENTS

| | | |
|---|---|---|
| JP | 2010-153638 A | 7/2010 |
| WO | 2017/047761 A1 | 3/2017 |

OTHER PUBLICATIONS

First Office Action dated May 21, 2026, issued in corresponding Chinese Patent Application No. 202110728108.2, with English machine translation (12 pgs.).

*Primary Examiner* — Holly Rickman
*Assistant Examiner* — Linda N Chau
(74) *Attorney, Agent, or Firm* — Cushman Partners LLC

(57) ABSTRACT

A magnetic base body relating to one or more embodiments of the present invention includes metal magnetic particles exhibiting a volume-based particle size distribution indicating that a most frequent particle size is less than 2 μm and that a cumulative frequency of particle sizes ranging from the smallest particle size to 30% of the most frequent particle size is equal to or less than 1% and an insulating film formed on the surface of each of the metal magnetic particles, where the insulating film exhibits insulating properties.

16 Claims, 6 Drawing Sheets

MAGNETIC BASE BODY CONTAINING METAL MAGNETIC PARTICLES AND COIL COMPONENT INCLUDING THE SAME

CROSS-REFERENCE TO RELATED APPLICATIONS

This application is a continuation of U.S. application Ser. No. 17/361,797, filed Jun. 29, 2021, which is based on and claims the benefit of priority from Japanese Patent Application Serial No. 2020-113176 (filed on Jun. 30, 2020), the contents of each of which are hereby incorporated by reference in their entirety.

TECHNICAL FIELD

The present disclosure relates to a magnetic base body containing metal magnetic particles, a coil component including the magnetic base body, a circuit board including the coil component and an electronic device including the circuit board.

BACKGROUND

In the conventional art, metal magnetic particles formed from a soft magnetic metal material containing Fe have been used to form magnetic base bodies for use in coil components. Conventional magnetic base bodies containing metal magnetic particles are disclosed in, for example, Japanese Patent Application Publication No. 2010-153638 ("the '638 Publication"). The '638 Publication discloses a magnetic base body (a pressed powder core) formed of metal magnetic particles including Fe-3Si alloy particles (i.e., particles of an alloy containing 3 wt % Si and Fe) having an average particle size of 100 to 145 μm and pure iron particles having an average particle size of 20 to 50 μm. The Fe-3Si alloy particles and pure iron particles are both covered with an insulating film, which reliably achieves insulation between adjacent ones of the particles. As disclosed in International Publication No. WO 2017/047761, it is also known that insulation between adjacent ones of the metal magnetic particles may be reliably achieved by an oxide film produced by oxidation of Fe and the other metal elements contained in the metal magnetic particles.

Coil components for use in high-frequency circuits experience large eddy current loss in the magnetic base body. To reduce the eddy current loss, it is desired to constitute the magnetic base body with metal magnetic particles having a reduced particle size. For example, for a high-frequency band covering 100 MHz or higher, the metal magnetic particles desirably have a particle size of less than 2 μm in order to reduce the eddy current loss.

The inventors of the present invention, however, have found that a magnetic base body constituted by metal magnetic particles encounter difficulties in reliably achieving insulation between the metal magnetic particles when the volume-based particle size distribution of the metal magnetic particles indicates that the most frequent particle size is less than 2 μm.

SUMMARY

An object of the present invention is to solve or relieve at least a part of the above problem. In particular, an object of the present invention is to accomplish improved insulating properties for a magnetic base body constituted by metal magnetic particles. One of the specific objects of the present invention is to accomplish improved insulating properties for a magnetic base body constituted by metal magnetic particles for which the volume-based particle size distribution indicates that the most frequent particle size is less than 2 μm.

The other objects of the disclosure will be apparent with reference to the entire description in this specification. The invention disclosed herein may solve any other drawbacks grasped from the following description, instead of or in addition to the above drawback.

Small-diameter metal magnetic particles have a broad particle size distribution due to limitations from the perspective of the manufacturing techniques. In the case of metal magnetic particles suitable for high-frequency application, the most frequent particle size is less than 2 μm. Such metal magnetic particles contain a large amount of fine powder having a particle size smaller than 30% of the most frequent particle size. In a magnetic base body constituted by metal magnetic particles, the framework is formed by particles having a particle size close to or larger than the most frequent particle size, and the particles having a small particle size equal to or less than 30% of the most frequent particle size are present in the gaps between the framework-forming particles. In the following description, for the sake of convenience, "small particles" denote ones of the metal magnetic particles contained in the magnetic base body that have a particle size equal to or less than 30% of the most frequent particle size, and "large particles" denote those having a particle size larger than the small particles.

For example, when the particles having the most frequent particle size are arranged at the lattice points of the hexagonal close-packed structure, the radius a of a sphere inscribed in a regular tetrahedron the vertices of which are positioned on the center of four closest particles is represented by the following expression 1. Here, the most frequent particle size (diameter) is D=2r.

$$a = \frac{\sqrt{6}}{6} r = \frac{\sqrt{6}}{12} D \qquad \text{Expression 1}$$

Accordingly, the distance b from the center of the sphere inscribed in the regular tetrahedron to the vertex of the regular tetrahedron is represented by the following expression 2.

$$b = \sqrt{3/2}\, r \cong 1.22r = 0.61\, D \qquad \text{Expression 2}$$

Therefore, the distance from the center of the sphere inscribed in the regular tetrahedron to the surface of the particle having the most frequent particle size that is centered on the vertex of the regular tetrahedron is expressed as: 0.22r(=1.22r−1r). This means that, when the particles having the most frequent particle size are arranged at the lattice points of the hexagonal close-packed structure, particles having a radius of 0.22r or less (i.e., having a diameter of 0.44r (0.22D) or less) can intervene in the gaps between the particles having the most frequent particle size. In real magnetic base bodies, their framework is formed by particles the particle size of which is not aligned with the most frequent particle size (in particular, some of the particles forming the framework have a particle size larger than the most frequent particle size). Accordingly, the gap between the large particles forming the framework is larger than the gap between the particles having the most frequent particle size filled to establish the hexagonal close-packed structure. For this reason, in actual magnetic base bodies constituted by metal magnetic particles having a predetermined particle size distribution, particles having a diameter of less than 0.3D (i.e., small particles having a particle size less than 30% of the most frequent particle size) can intervene in the gaps between large particles having a particle size close to or larger than the most frequent particle size and forming the framework of the magnetic base bodies. As noted, the small particles having a particle size less than 30% of the most frequent particle size are likely to fill the gaps between the large particles forming the framework of the magnetic base bodies.

The inventors of the present invention have found the following. In a conventional magnetic base body constituted by metal magnetic particles for which the most frequent particle size is less than 2 μm, electrically conductive $Fe_3O_4$ (magnetite) is likely to appear on the surface of the large particles forming the framework of the magnetic base body. As the content of the magnetite on the surface of the particles having a relatively large particle size increases, the insulating properties of the magnetic base body degrade. Magnetite is likely to be formed on the surface of the large particles for the following reasons. Since the small particles have a large specific surface area and are thus susceptible to oxidation, the small particles consume a large amount of oxygen in the atmosphere when the metal magnetic particles are heated during the process of manufacturing the magnetic base body and the large particles surrounding the small particles do not receive a sufficient amount of oxygen.

The present invention has been completed based on the aforedescribed new findings. In one or more embodiments of the present invention, the volume-based particle size distribution exhibited by the metal magnetic particles indicates that the most frequent particle size is less than 2 μm and that the cumulative frequency of the particle sizes ranging from the smallest particle size to 30% of the most frequent particle size is equal to or less than 1%. The magnetic base body relating to one or more embodiments of the present invention includes metal magnetic particles exhibiting a volume-based particle size distribution indicating that a most frequent particle size is less than 2 μm and that a cumulative frequency of particle sizes ranging from a smallest particle size to 30% of the most frequent particle size is equal to or less than 1% and an insulating film formed on a surface of each of the metal magnetic particles, where the insulating film exhibits insulating properties.

Since the particle size distribution of the metal magnetic particles contained in the magnetic base body indicates that the cumulative frequency of the particle sizes ranging from the smallest particle size to 30% of the most frequent particle size is equal to or less than 1%, a reduced amount of oxygen is consumed when the metal magnetic particles are heated during the process of manufacturing the magnetic base body for oxidation of the small particles having a particle size smaller than 30% of the most frequent particle size. Accordingly, a sufficient amount of oxygen is fed to the metal magnetic particles having a particle size larger than 30% of the most frequent particle size. This can prevent generation of electrically conductive magnetite on the surface of the particles having a particle size larger than 30% of the most frequent particle size. Thereby, the magnetic base body can achieve improved insulating properties.

The small particles can be interposed in the gaps between the large particles forming the framework of the magnetic base body and thus can contribute to improve the filling factor of the metal magnetic particles in the magnetic base body. Therefore, according to the design of normal coil components, it is highly encouraged to mix the large and small particles to produce the metal magnetic particles so that the small particles can intervene between the large particles in order to improve the magnetic permeability of the coil components. In one or more embodiments of the present invention, on the other hand, high insulating properties is achieved by reducing the ratio of the small particles in the metal magnetic particles.

In one or more embodiments of the invention, the most frequent particle size of the metal magnetic particles contained in the magnetic base body is 0.3 μm or greater.

In one or more embodiments of the present invention, two adjacent ones of the metal magnetic particles are bound together through an insulating film formed on a surface of the two adjacent metal magnetic particles.

In one or more embodiments of the present invention, the metal magnetic particles may be made of an Fe-containing alloy. In one or more embodiments of the present invention, a total content of Si and one or more metal elements that are more susceptible to oxidation than Fe in the metal magnetic particles is 8 wt % or more.

In one or more embodiments of the present invention, the insulating film includes an oxide of Si and an oxide of a metal element that is more susceptible to oxidation than Fe.

One or more embodiments of the present invention relate to a coil component including any one of the above magnetic base bodies and a coil conductor embedded in the magnetic base body. One or more embodiments of the present invention relate to a circuit board including the above coil component. One embodiment of the present invention relates to an electronic device including the above circuit board.

Advantageous Effects

According to one or more embodiments of the present invention, a magnetic base body can accomplish improved insulating properties even when constituted by metal magnetic particles for which the volume-based particle size distribution indicates that the most frequent particle size is less than 2 μm.

DESCRIPTION OF THE PREFERRED EMBODIMENTS

The following describes various embodiments of the present invention by referring to the appended drawings as appropriate. The constituents common to multiple drawings are denoted by the same reference signs throughout the drawings. For convenience of explanation, the drawings are not necessarily drawn to scale.

Figure 1:
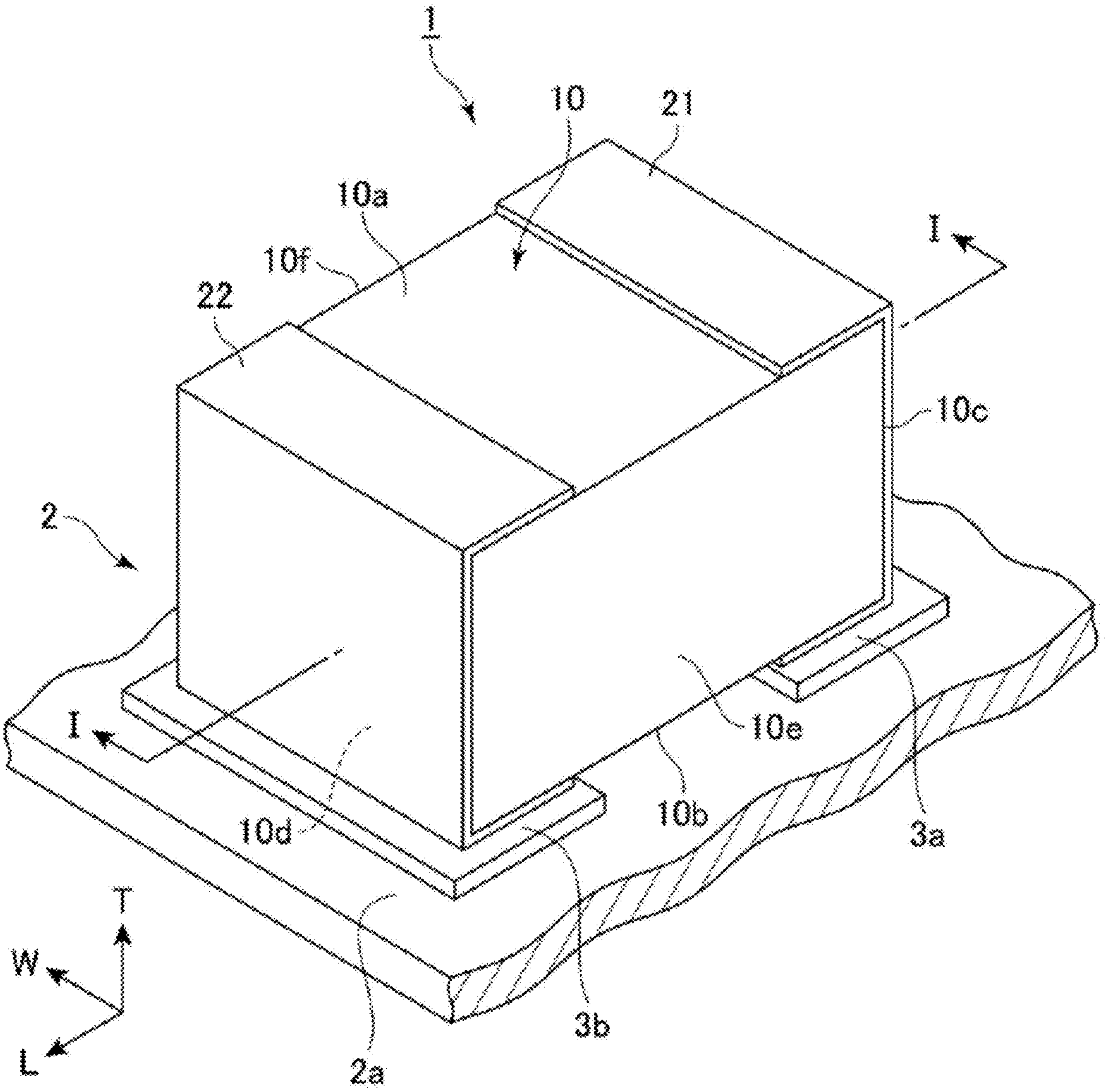
FIG. 1 is a perspective view of a coil component according to one embodiment of the invention.
Figure 2:
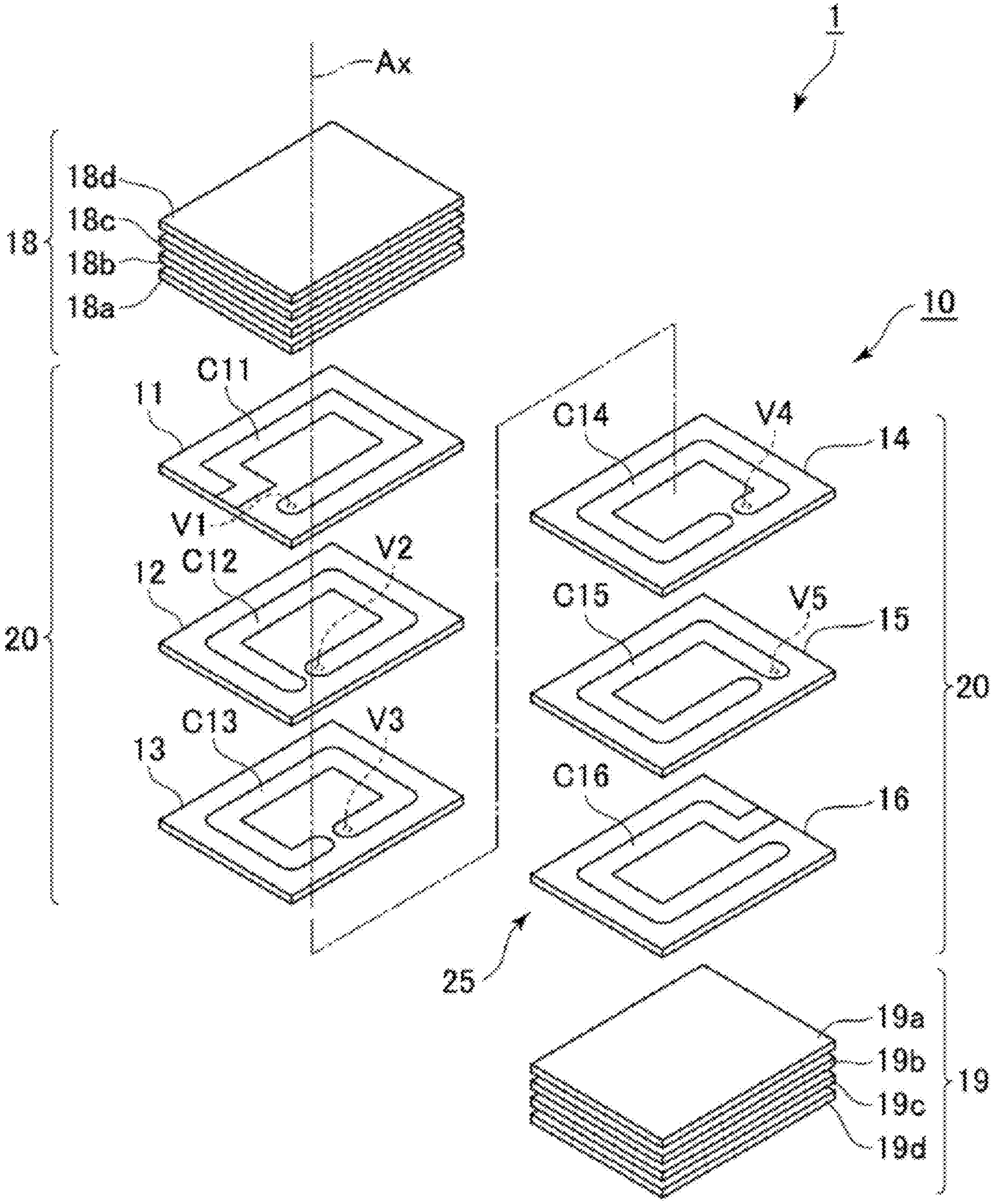
FIG. 2 is an exploded perspective view of the coil component shown in FIG. 1.
Figure 3:
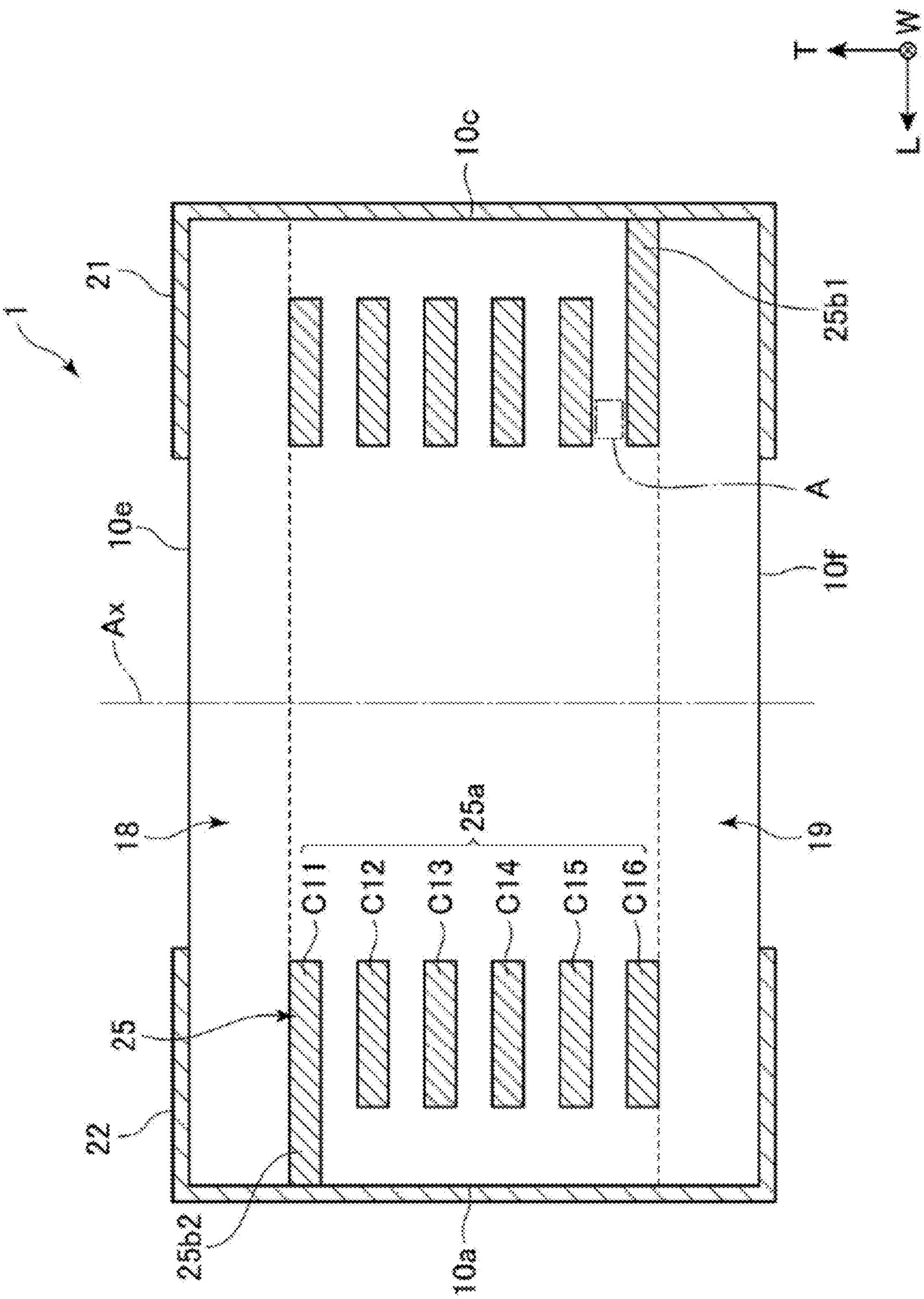
FIG. 3 schematically shows a cross-section of the coil component along the line I-I in FIG. 1.
Figure 4:
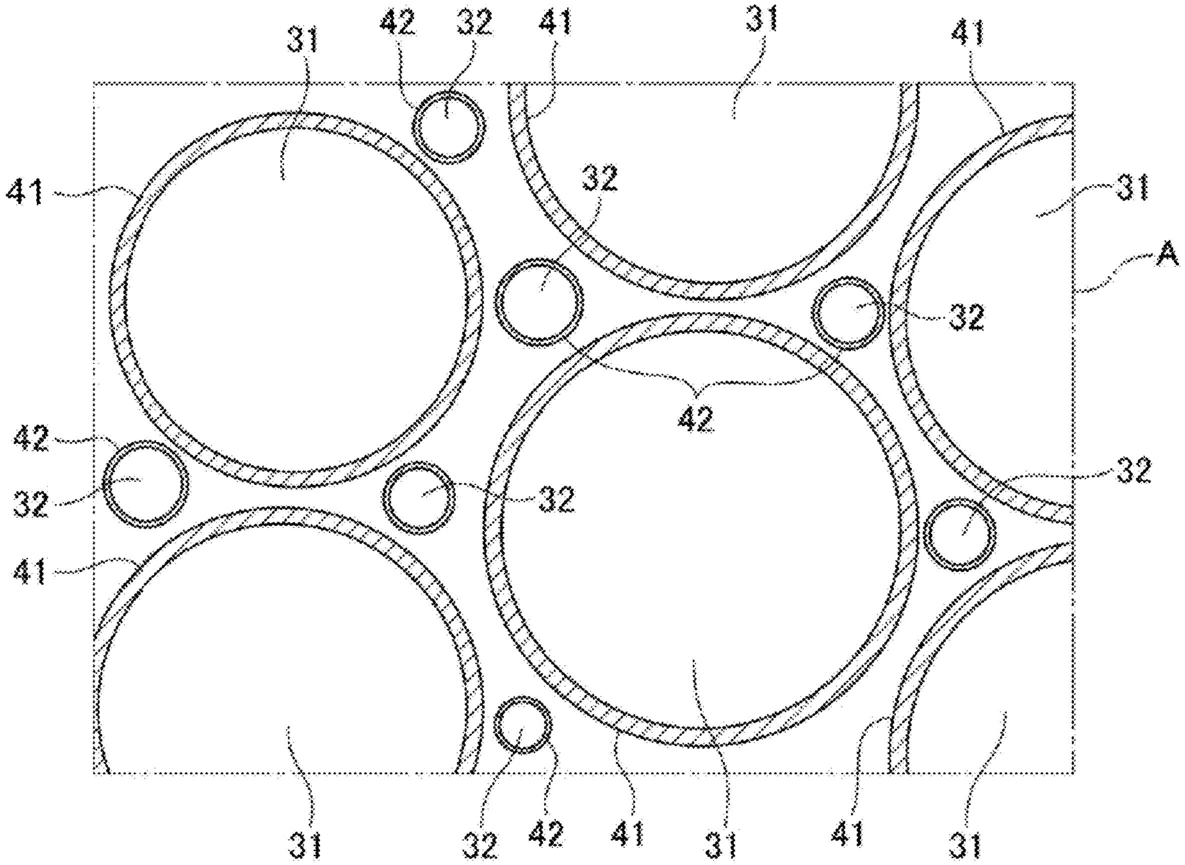
FIG. 4 schematically shows a region A of the cross-section of the magnetic base body shown in FIG. 3.

A coil component 1 according to one embodiment of the present invention will be hereinafter described with reference to FIGS. 1 to 4. FIG. 1 is a perspective view of the coil component 1 according to one embodiment of the invention, FIG. 2 is an exploded perspective view of the coil component 1, FIG. 3 schematically shows the cross-section of the coil component 1 along the I-I line in FIG. 1, and FIG. 4 schematically shows a region A of the cross-section of the coil component 1 shown in FIG. 3. The coil component 1 is an example coil component to which the present invention is applicable. In the illustrated embodiment, the coil component 1 is a laminated inductor. The laminated inductor may be used as a power inductor incorporated into a power supply line or as other various inductors. The present invention is applicable to various coil components other than the illustrated laminated inductor, for example, coil components formed by the thin film process, wire-wound coil components having a conductor wire being wound around a compact core (a magnetic base body) and the magnetic base body included in these coil components.

As shown in FIGS. 1 and 3, the coil component 1 relating to one or more embodiments of the present invention includes a magnetic base body 10, a coil conductor 25 having a winding portion 25*a* extending around a coil axis Ax, an external electrode 21 disposed on the surface of the magnetic base body 10, and an external electrode 22 disposed on the surface of the magnetic base body 10 at a position spaced from the external electrode 21.

The coil component 1 is mounted on a mounting substrate 2*a*. The mounting substrate 2*a* has two land portions 3 provided thereon. The coil component 1 is mounted on the mounting substrate 2*a* by bonding the external electrodes 21 and 22 to the corresponding land portions 3 of the mounting substrate 2*a*. As described, a circuit board 2 includes the coil component 1 and the mounting substrate 2*a* having the coil component 1 mounted thereon. The circuit board 2 may include the coil component 1 and various electronic components in addition to the coil component 1.

The circuit board 2 can be installed in various electronic devices. The electronic devices in which the circuit board 2 may be installed include smartphones, tablets, game consoles, electrical components of automobiles, and various other electronic devices. The electronic devices in which the coil component 1 may be installed are not limited to those specified herein. The coil component 1 may be a built-in component embedded in the circuit board 2.

In the embodiment shown, the magnetic base body 10 has a rectangular parallelepiped shape as a whole. The magnetic base body 10 has a first principal surface 10*a*, a second principal surface 10*b*, a first end surface 10*c*, a second end surface 10*d*, a first side surface 10*e*, and a second side surface 10*f*, and the six surfaces define the outer surface of the magnetic base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. In FIG. 1, the first principal surface 10*a* lies on the top side of the magnetic base body 10, and therefore, the first principal surface 10*a* may be herein referred to as "the top surface." Similarly, the second principal surface 10*b* may be referred to as "the bottom surface." The magnetic coupling coil component 1 is disposed such that the second principal surface 10*b* faces the mounting substrate 2*a*, and therefore, the second principal surface 10*b* may be herein referred to as "the mounting surface." The top-bottom direction of the coil component 1 refers to the top-bottom direction in FIG. 1. In this specification, a "length" direction, a "width" direction, and a "height" direction of the coil component 1 correspond to the "L axis" direction, the "W axis" direction, and the "T axis" direction in FIG. 1, respectively, unless otherwise construed from the context. The L axis, the W axis, and the Taxis are perpendicular to one another. The coil axis Ax extends in the Taxis direction. For example, the coil axis Ax passes through the intersection of the diagonal lines of the first principal surface 10*a*, which is rectangularly shaped as seen from above, and extends perpendicularly to the first principal surface 10*a*.

In one or more embodiments of the present invention, the coil component 1 has a length (the dimension in the direction of the L axis) of 0.2 to 6.0 mm, a width (the dimension in the direction of the W axis) of 0.1 to 4.5 mm, and a height (the dimension in the direction of the T axis) of 0.1 to 4.0 mm. These dimensions are mere examples, and the coil component 1 to which the present invention is applicable can have any dimensions that conform to the purport of the present invention. In one or more embodiments, the coil component 1 has a low profile. For example, the coil component 1 has a width larger than the height thereof.

The magnetic base body 10 is made of a magnetic material. In one or more embodiments of the present invention, the magnetic base body 10 contains a plurality of metal magnetic particles. The metal magnetic particles can be particles or powder of a soft magnetic metal material. The soft magnetic metal material used to prepare the metal magnetic particles contains Fe, Si and metal elements that are more susceptible to oxidation than Fe (for example, at least one of Cr or Al), for example, (1) an alloy-based material such as Fe—Si—Cr, Fe—Si—Al, or Fe—Ni; (2) an amorphous material such as Fe—Si—Cr—B—C or Fe—Si—B—Cr; or (3) a mixture thereof. When the metal magnetic particles are of an alloy-based material, the content of Fe in the metal magnetic particles may be 80 wt % or more but less than 92 wt %. When the metal magnetic particles are of an amorphous material, the content of Fe in the metal magnetic particles may be 72 wt % or more but less than 85 wt %. Since the metal magnetic particles contain particles of elements other than Fe (Si and metal elements that are more susceptible to oxidation than Fe), oxidation of Fe contained in the metal magnetic particles can be reduced. In the metal magnetic particles, Si and metal elements that are more susceptible to oxidation than Fe may account for, in total, 8 wt % or more, or 10 wt % or more.

In one or more embodiments of the present invention, the particle sizes of the metal magnetic particles contained in the magnetic base body 10 are distributed according to a predetermined particle size distribution (alternatively may be referred to as "particle diameter distribution"). In one or more embodiments of the invention, the volume-based particle size distribution of the metal magnetic particles constituting the magnetic base body 10 indicates that the most frequent particle size is equal to or greater than 0.3 μm and less than 2 μm. As is apparent among those skilled in the art, the most frequent particle size may be referred to as "the modal diameter." The volume-based particle size of the metal magnetic particles is measured by the laser diffraction scattering method in conformity to JIS Z 8825. An example of the devices for use with the laser diffraction scattering method is the laser diffraction/scattering particle size distribution measuring device (Model Number: LA-960) available from HORIBA Ltd., at Kyoto city, Kyoto, Japan.

Among the metal magnetic particles contained in the magnetic base body 10, the particles that have a particle size equal to or less than 30% of the most frequent particle size are arranged in the gaps between the particles having a particle size larger than 30% of the most frequent particle size. In FIG. 4, a reference numeral 31 indicates, among the metal magnetic particles constituting the magnetic base body 10, the particles that have a particle size greater than 30% of the most frequent particle size, and a reference numeral 32 indicates the particles having a particle size equal to or less than 30% of the most frequent particle size. In the following description of the embodiments, for the sake of convenience, large particles 31 denote ones of the metal magnetic particles constituting the magnetic base body 10 that have a particle size greater than 30% of the most frequent particle size, and small particles 32 denote those having a particle size equal to or less than 30% of the most frequent particle size. As illustrated, the large particles 31 form the framework of the magnetic base body 10, and the small particles 32 are arranged in the gap between the adjacent ones of the large particles 31.

An insulating film is formed on the surface of the metal magnetic particles included in the magnetic base body 10. As illustrated in FIG. 4, an insulating film 41 is provided on the surface of the large particles 31, and an insulating film 42 is provided on the surface of the small particles 32. The insulating film on the surface of the metal magnetic particles may be an oxide film produced by oxidation of Si and an oxide film produced by oxidation of a metal element that is more susceptible to oxidation than Fe. The insulating film on the surface of the metal magnetic particles may be, for example, an oxide film formed by oxidizing the surface of the metal magnetic particles. The insulating film on the surface of the metal magnetic particles may be an oxide film resulting from oxidization of a thin film coating the surface of each of the metal magnetic particles and containing Si and a metal element that is more susceptible to oxidation than Fe.

In one or more embodiments of the invention, the volume-based particle size distribution of the metal magnetic particles constituting the magnetic base body 10 indicates that the cumulative frequency of the particle sizes ranging from the smallest particle size to 30% of the most frequent particle size is equal to or less than 1%. In other words, of the metal magnetic particles constituting the magnetic base body 10, the particles having a particle size equal to or less than 30% of the most frequent particle size (i.e., the small particles 32) account for 1 vol % or less, where 100 vol % represents the total volume of the metal magnetic particles constituting the magnetic base body 10. Since the small particles 32 account for 1 vol % or less of the metal magnetic particles contained in the magnetic base body 10, a reduced amount of oxygen is consumed by the small particles 32 when the metal magnetic particles are heated during the process of manufacturing. Accordingly, a sufficient amount of oxygen is fed to the large particles 31. This can prevent generation of electrically conductive magnetite on the surface of the large particles 31. Thereby, the magnetic base body 10 can accomplish improved insulating properties. The volume of the small particles may account for 1 vol % or less of the total volume of the metal magnetic particles throughout the entire region of the magnetic base body 10, or only in a partial region of the magnetic base body 10.

As shown in FIGS. 2 and 3, the magnetic base body 10 includes a plurality of magnetic layers stacking on top of each other. As shown, the magnetic base body 10 may include a body portion 20, a top cover layer 18 provided on the top surface of the body portion 20, and a bottom cover layer 19 provided on the bottom surface of the body portion 20. The body portion 20 includes magnetic layers 11 to 16 stacked together. The magnetic base body 10 includes the top cover layer 18, the magnetic layer 11, the magnetic layer 12, the magnetic layer 13, the magnetic layer 14, the magnetic layer 15, the magnetic layer 16, the magnetic layer 17 and the bottom cover layer 19 that are stacked in this order from the top to the bottom in FIG. 2.

The top cover layer 18 includes four magnetic layers **18*a* to 18*d*. In the top cover layer 18, the magnetic layer 18*a*, the magnetic layer 18*b*, the magnetic layer 18*c*, and the magnetic layer 18*d* are stacked in this order from the bottom to the top in FIG. 2**.

The bottom cover layer 19 includes four magnetic layers **19*a* to 19*d*. The bottom cover layer 19 includes the magnetic layer 19*a*, the magnetic layer 19*b*, the magnetic layer 19*c*, and the magnetic layer 19*d* that are stacked in this order from the top to the bottom in FIG. 2**.

The coil component 1 can include any number of magnetic layers as necessary in addition to the magnetic layers 11 to 16, the magnetic layers **18*a* to 18*d*, and the magnetic layers 19*a* to 19*d*. Some of the magnetic layers 11 to 16, the magnetic layers 18*a* to 18*d*, and the magnetic layers 19*a* to 19*d* can be omitted as appropriate. Although the boundaries between the magnetic layers are shown in FIG. 3, the boundaries between the magnetic layers may not be visible in the magnetic base body 10** of the actual coil component to which the invention is applied.

The magnetic layers 11 to 16 have conductor patterns C11 to C16, respectively, formed on the top-side surface thereof. The conductor patterns C11 to C16 extend around the coil axis Ax. The conductor patterns C11 to C16 are formed by printing such as screen printing, plating, etching, or any other known method. The magnetic layers 11 to 15 respectively have vias V1 to V5 formed therein at a predetermined position. The vias V1 to V5 are formed by forming a through-hole at the predetermined position in the magnetic layers 11 to 15 so as to extend through the magnetic layers 11 to 15 in the Taxis direction and filling the through-holes with a conductive material. The conductor patterns C11 to C16 and the vias V1 to V5 contain a highly conductive metal, such as Ag, Pd, Cu, or Al, or any alloy of these metals. In the embodiment shown, the coil axis Ax extends in the Taxis direction, which is the same as the direction in which the magnetic layers 11 to 16 are stacked on each other.

Each of the conductor patterns C11 to C16 is electrically connected to the respective adjacent conductor patterns through the vias V1 to V5. The conductor patterns C11 to C16 connected in this manner form the spiral winding portion **25*a*. In other words, the winding portion 25*a* of the coil conductor 25 includes the conductor patterns C11 to C16 and the vias V1 to V5**.

The end of the conductor pattern C11 opposite to the end connected to the via V1 is connected to the external electrode 22 via a lead-out conductor **25*b*2. The end of the conductor pattern C16 opposite to the end connected to the via V5 is connected to the external electrode 21 via a lead-out conductor 25*b*1. As mentioned, the coil conductor 25 includes the winding portion 25*a*, the lead-out conductor 25*b*1 and the lead-out conductor 25*b*2**.

As described above, the coil conductor 25 has the winding portion **25*a* extending around the coil axis Ax and is enclosed within the magnetic base body 10. As for the coil conductor 25, the end portions of the lead-out conductors 25*b*1 and 25*b*2** are exposed through the magnetic base body 10 to the outside, but the rest of the coil conductor 25 is inside the magnetic base body 10.

As has been described above, in one or more embodiments of the present invention, the small particles 32 accounts for 1 vol % or less of the total volume of the metal magnetic particles throughout the entire region of the magnetic base body 10. In this case, in each of the magnetic layers 11 to 16, 18*a* to 18*d* and 19*a* to 19*d* constituting the magnetic base body 10, the small particles 32 accounts for 1 vol % or less of the total volume of the metal magnetic particles. In one or more embodiments of the present invention, the small particles 32 accounts for 1 vol % or less of the total volume of the metal magnetic particles only in a partial region of the magnetic base body 10. For example, in the region between two adjacent ones of the conductor patterns C11 to C16, the small particles 32 accounts for 1 vol % or less of the total volume of the metal magnetic particles in the region. In this case, in each of the magnetic layers 11 to 15, which are part of the magnetic layers constituting the magnetic base body 10, the small particles 32 accounts for 1 vol % or less of the total volume of the metal magnetic particles. In some or all of the magnetic layers 18*a* to 18*d* and 19*a* to 19*d*, the small particles 32 may account for more than 1 vol % of the total volume of the metal magnetic particles.

Next, a description is given of an example of a manufacturing method of the coil component 1. In one or more embodiments of the present invention, the coil component 1 is produced by the sheet lamination method in which magnetic sheets are stacked together. The first step of manufacturing the coil component 1 using the sheet lamination method, a top laminate, an intermediate laminate, and a bottom laminate are formed. The top laminate will constitute the top cover layer 18, the intermediate laminate will constitute the body portion 20, and the bottom laminate will constitute the bottom cover layer 19. The top laminate is formed by stacking a plurality of magnetic sheets, which are to form the magnetic layers 18*a* to 18*d*, the bottom laminate is formed by stacking a plurality of magnetic sheets, which are to form the magnetic layers 19*a* to 19*d*, and the intermediate laminate is formed by stacking a plurality of magnetic sheets, which are to form the magnetic layers 11 to 16.

In order to fabricate the magnetic sheets, metal magnetic particles are prepared. The metal magnetic particles can be prepared by classifying a group of particles (hereinafter, referred to as "the source particles") prepared using a known technique such as water atomization. The volume-based particle size distribution of the source particles indicates that the most frequent particle size is less than 2 μm. The source particles are classified such that coarse particles having a particle size larger than a predetermined particle size (for example, 5 μm) are removed from the source particles. In the following description, "primary classification" refers to the classification performed on the source particles, and "intermediate particles" refers to the group of particles left by removing the coarse particles from the source particles. The most frequent particle size of the intermediate particles is equal to the most frequent particle size of the source particles. Subsequently, the intermediate particles are classified such that small particles having a particle size equal to or less than 30% of the most frequent particle size are removed from the intermediate particles. In this manner, the metal magnetic particles for use in the fabrication of the magnetic sheets can be obtained. The most frequent particle size of the metal magnetic particles is equal to the most frequent particle size of the intermediate particles. This secondary classification is performed such that the volume-based particle size distribution of the metal magnetic particles resulting from the secondary classification indicates that the cumulative frequency of the particle sizes ranging from the smallest particle size to 30% of the most frequent particle size is equal to or less than 1%. In the following description, the "secondary classification" refers to the classification performed on the intermediate particles. The primary and secondary classifications can be performed using air separation, settling classification or any other known classifying techniques. When the secondary classification is performed using air separation, the air flow rate and velocity may be adjusted such that the volume-based particle size distribution of the metal magnetic particles resulting from the secondary classification indicates that the cumulative frequency of the particle sizes ranging from the smallest particle size to 30% of the most frequent particle size is equal to or less than 1%.

Figure 5:
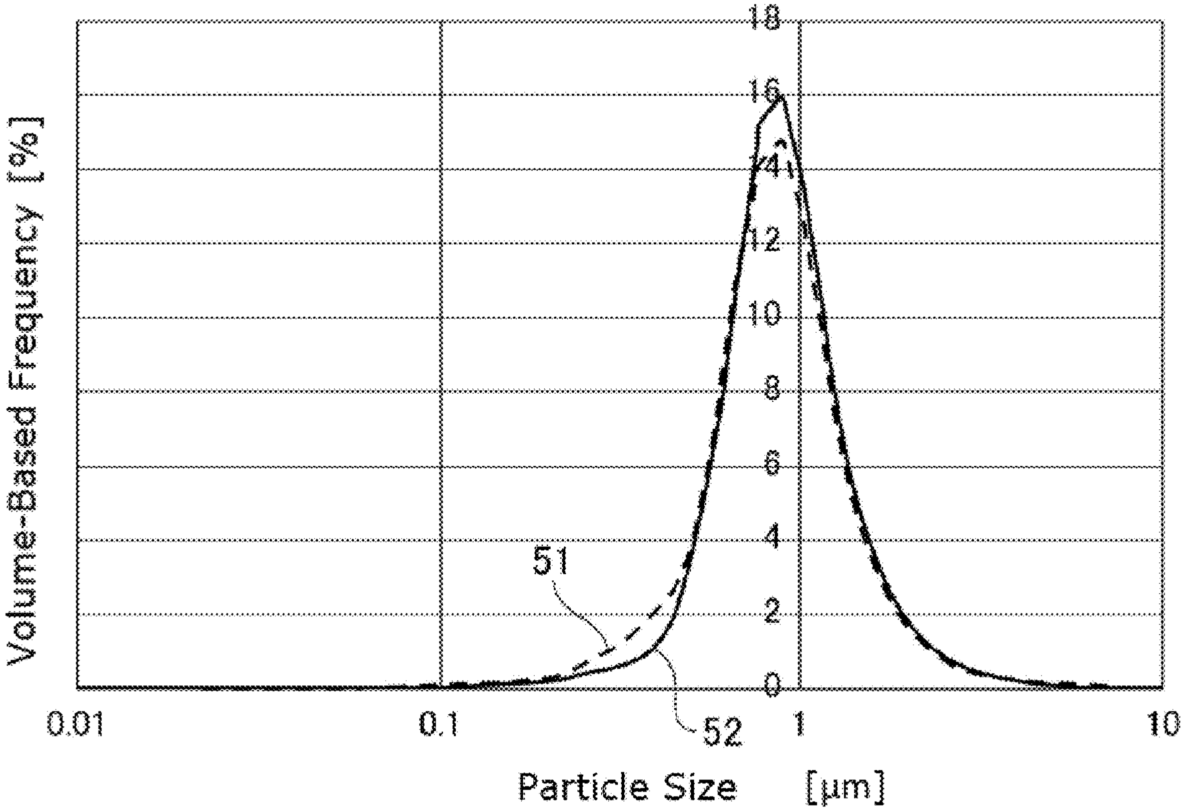
FIG. 5 is a graph showing a volume-based particle size distribution of the metal magnetic particles contained in a magnetic base body 10.

The particle size distributions of the intermediate and metal magnetic particles are shown in FIG. 5. As shown, the most frequent particle size indicated by a particle size distribution 51 of the intermediate particles is equal to the most frequent particle size of a particle size distribution 52 of the metal magnetic particles. Comparing the particle size distribution 51 of the intermediate particles against the particle size distribution 52 of the metal magnetic particles reveals that the frequency of the particle sizes equal to or less than 30% of the most frequent particle size is lower in the particle size distribution 52 of the metal magnetic particles than in the particle size distribution 51 of the intermediate particles. In addition, the particle size distribution 52 of the metal magnetic particles is shaper than the particle size distribution 51 of the intermediate particles since the frequency of the most frequent particle size and similar particle sizes is higher in the former than in the latter.

After this, the metal magnetic particles obtained in the above manner are mixed and kneaded with a resin to produce a slurry (this slurry is referred to as "a metal magnetic paste"), and the metal magnetic paste is poured into a mold, to which a predetermined molding pressure is applied. As a result, a magnetic sheet is fabricated. The resin mixed and kneaded together with the metal magnetic particles may be, for example, a polyvinyl butyral (PVB) resin, an epoxy resin, or any other known resins.

The intermediate laminate is formed by stacking a plurality of magnetic sheets having unfired conductor patterns formed thereon, which correspond to the conductor patterns C11 to C16. A through hole is formed in and penetrates the stacking direction through each of the magnetic sheets prepared for forming the intermediate laminate, and a conductor paste is applied using screen printing or the like on the magnetic sheets having the through hole formed therein, so that the unfired conductor patterns are formed, which are to form the conductor patterns C11 to C16 after fired. During this processing, the conductor paste fills the through hole in the magnetic sheets, so that unfired vias are formed and to form the vias V1 to V5. The top and bottom laminates are each formed by stacking four magnetic sheets that have been prepared in the sheet preparation step and that have no unfired conductor pattern formed thereon.

Next, the intermediate laminate formed in the above-described manner is sandwiched between the top laminate on the top side and the bottom laminate on the bottom side, and the top and bottom laminates are bonded to the intermediate laminate by thermal compression to obtain a body laminate. Next, the body laminate is diced into pieces of a desired size using a cutter such as a dicing machine or a laser processing machine to obtain chip laminates.

Next, the chip laminate is degreased, and the degreased chip laminate is heated. The heating is performed on the chip laminate at a temperature of 400° C. to 900° C. for a duration of 20 to 120 minutes, for example. The degreasing and heating may be concurrently performed.

Following the heating, a conductive paste (for example, a silver paste) is applied to the surface of the chip laminate to form the external electrode 21 and the external electrode 22. The coil component 1 is obtained through the above steps.

Alternatively, the coil component 1 may be manufactured by a method known to those skilled in the art other than the sheet manufacturing method, for example, a slurry build method or a thin film process method.

Figure 6:
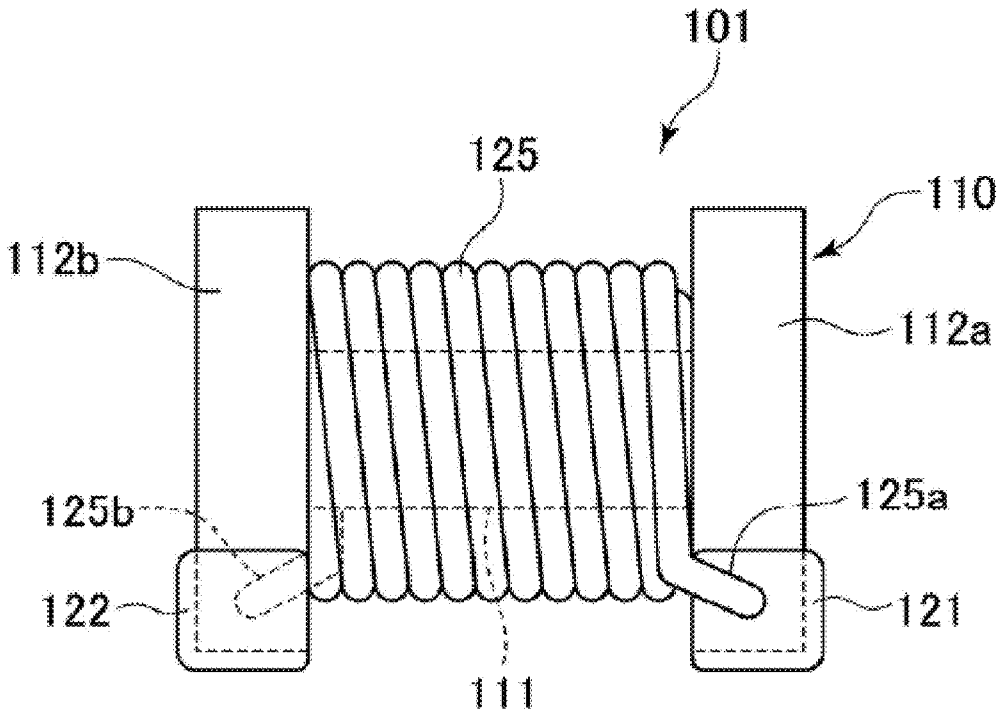
FIG. 6 is a front view of a coil component according to one embodiment of the invention.

The illustrated laminated inductor is an example of the coil component to which the invention can be applied. The invention can also be applied to various types of coil components other than laminated inductors. For example, the invention may be applied to wire-bound coil components. The following describes a coil component 101 according to another embodiment of the invention with reference to FIG. 6. The coil component 101 shown in FIG. 6 is a wire-wound inductor including a magnetic base body 110 and a coil conductor 125 (a winding wire 125) wound around the magnetic base body 110. As shown, the coil component 101 includes a magnetic base body 110, a coil conductor 125, a first external electrode 121 and a second external electrode 122. The magnetic base body 110 includes a winding core 111, a flange 112*a* having a rectangular parallelepiped shape and provided on one of the ends of the winding core 111, and a flange 112*b* having a rectangular parallelepiped shape and provided on the other end of the winding core 111. The coil conductor 125 is wound on the winding core 111. The coil conductor 125 includes a conductive line made of a highly conductive metal material and an insulating coating covering and surrounding the conductive line. The first external electrode 121 extends along the bottom surface of the flange 112*a*, and the second external electrode 122 extends along the bottom surface of the flange 112*b*.

Like the magnetic base body 10, the magnetic base body 110 is made of a magnetic material containing metal magnetic particles exhibiting a volume-based particle size distribution that indicates that the most frequent particle size is less than 2 μm and that the cumulative frequency of particle sizes ranging from the smallest particle size to 30% of the most frequent particle size is equal to or less than 1%.

Next, a description is given of an example manufacturing method of the coil component 101. The magnetic base body 110 is first fabricated. To fabricate the magnetic base body 110, metal magnetic particles are mixed and kneaded with a resin to produce a resin composition mixture. The resin composition mixture is poured into a mold having a cavity shaped to correspond to the magnetic base body 110, and a predetermined molding pressure is applied to the resin composition mixture in the mold while the resin composition mixture in the mold is heated. In this way, a molded body is fabricated. After this, the molded body is degreased and the degreased molded body is subjected to thermal treatment in weak oxidizing atmosphere with an oxygen concentration of 10 to 5000 ppm. As a result, the magnetic base body 110 is produced. The duration of the heating in the thermal treatment is, for example, 20 minutes to 120 minutes, and the heating temperature is, for example, 250° C. to 850° C.

The coil conductor 125 is then would around the magnetic base body 110 resulting from the above-described thermal treatment, one of the ends of the coil conductor 125 is connected to the first external electrode 121, and the other end is connected to the second external electrode 122. The coil component 101 is obtained in the above-described manner.

The shape and position of the constituting elements of the coil conductor 101 are not limited to those illustrated in FIG. 6. For example, the magnetic base body 110 may be a ring-shaped toroidal core. The coil component 101 may be alternatively a toroidal coil including a ring-shaped magnetic base body 110 (toroidal core 110) and a coil conductor 125 wound around the magnetic base body 110.

EXAMPLES

Next, examples of the invention will now be described. The samples to be evaluated were fabricated in the following manner. To fabricate eight types of samples numbered A1 to A8 as shown in Table 1, eight types of metal magnetic particles were prepared that had a composition of Fe—Si—Cr (Si: 8 wt %, Cr: 2 wt %, Fe and inevitable impurities account for the remaining) and had the most frequent particle size and small particle ratio shown in Table 1 in association with the sample numbers A1 to A8. In addition, to fabricate two types of samples numbered A9 and A10, two types of metal magnetic particles were prepared that had a composition of Fe—Si—Cr—Al (Si: 7 wt %, Cr: 1.5 wt %, Al: 1.5 wt %, Fe and inevitable impurities account for the remaining) and had the most frequent particle size and small particle ratio shown in Table 1 in association with the sample numbers A9 and A10. The term "small particle ratio" appearing in Table 1 indicates the cumulative frequency of the particle sizes ranging from the smallest particle size to 30% of the most frequent particle size in the volume-based particle size distribution of the metal magnetic particles for the samples A1 to A10.

The above-listed ten types of metal magnetic particles were each mixed with a PVB resin and an organic solvent, thereby producing ten types of metal magnetic pastes. The ten types of metal magnetic pastes were then poured into a mold, to which a molding pressure was applied. As a result, ten types of plate-shaped molded bodies having a thickness of 1 mm were fabricated.

The ten types of molded bodies were each punched into molded bodies shaped liked a toroidal core having an outer diameter of 10 mmφ and an inner diameter of 5 mmφ. After this, the molded bodies shaped like a toroidal core were degreased and the degreased molded bodies were thermally treated in weak oxidizing atmosphere with an oxygen concentration of 1000 ppm for a duration of 60 minutes at a temperature of 600° C. In the above-described manner, the samples A1 to A10 were fabricated. For the test pieces fabricated in the above-described manner, which were shaped like a toroidal and numbered A1 to A10, their relative permeability was measured using the impedance analyzer E4991A available from Agilent Technologies Inc. The obtained relative permeability of the test pieces was listed in Table 1 along with their most frequent particle size and small particle ratio.

TABLE 1

| Sample Number | Composition | Most Frequent Particle Size (μm) | Small Particle Ratio (vol %) | Relative Permeability |
|---|---|---|---|---|
| A1 (Example) | FeSiCr | 0.9 | 0.1 | 10.3 |

TABLE 1-continued

| Sample Number | Composition | Most Frequent Particle Size (μm) | Small Particle Ratio (vol %) | Relative Permeability |
|---|---|---|---|---|
| A2 (Example) | FeSiCr | 0.9 | 0.5 | 10.3 |
| A3 (Example) | FeSiCr | 0.9 | 1.0 | 10.2 |
| A4 (Comparative Example) | FeSiCr | 0.9 | 2.0 | 10 |
| A5 (Example) | FeSiCr | 1.9 | 1.0 | 15.2 |
| A6 (Comparative Example) | FeSiCr | 1.9 | 2.0 | 15.1 |
| A7 (Example) | FeSiCr | 0.3 | 1.0 | 5.2 |
| A8 (Comparative Example) | FeSiCr | 0.3 | 2.0 | 4.8 |
| A9 (Example) | FeSiCrAl | 0.9 | 1.0 | 9.2 |
| A10 (Comparative Example) | FeSiCrAl | 0.9 | 2.0 | 9.1 |

In addition, the above-mentioned ten types of molded bodies were each punched into single-layer plates shaped like a square of 1 cm and having a thickness of 1 mm. After this, the veneer plates were degreased and the degreased veneer plated were thermally treated in weak oxidizing atmosphere with an oxygen concentration of 1000 ppm for a duration of 60 minutes at a temperature of 600° C. Subsequently, a silver paste was applied to both of the surfaces of the thermally treated veneer plates, so that a pair of electrodes was formed. As a result, samples B1 to B10 were fabricated. The samples B1 to B10 each had the same most frequent particle size and small particle ratio as the corresponding samples A1 to A10, as shown in FIG. 2, but were shaped differently from the samples A1 to A10. For the veneer plates fabricated in the above-described manner and numbered B1 to B10, their specific resistance was measured using an ultra high resistance meter 5451 available from ADC Corporation. For the veneer plates numbered B1 to B10, the voltage applied between the electrodes was increased in a stepwise manner, and a voltage at the time of occurrence of a short circuit was measured. The voltage at the time of occurrence of a short circuit was divided by the distance between the electrodes, and the result was defined as a withstand voltage of each test piece. The specific resistance and withstand voltage of the test pieces measured in the above manner were listed in Table 2 together with their most frequent particle size and small particle ratio.

TABLE 2

| Sample Number | Com-position | Most Frequent Particle Size (μm) | Small Particle Ratio (vol %) | Specific Resistance (Ω · m) | With-stand Voltage (V/μm) |
|---|---|---|---|---|---|
| B1(Example) | FeSiCr | 0.9 | 0.1 | 3.5E+08 | 5.3 |
| B2(Example) | FeSiCr | 0.9 | 0.5 | 3.2E+08 | 5.0 |
| B3 (Example) | FeSiCr | 0.9 | 1.0 | 3.1E+08 | 5.0 |
| B4 (Comparative Example) | FeSiCr | 0.9 | 2.0 | 4.3E+02 | 0.6 |
| B5 (Example) | FeSiCr | 1.9 | 1.0 | 9.2E+08 | 2.7 |
| B6 (Comparative Example) | FeSiCr | 1.9 | 2.0 | 9.1E+02 | 0.3 |
| B7 (Example) | FeSiCr | 0.3 | 1.0 | 1.5E+08 | 6.2 |
| B8 (Comparative Example) | FeSiCr | 0.3 | 2.0 | 9.9E+01 | 0.7 |
| B9 (Example) | FeSiCrAl | 0.9 | 1.0 | 2.1E+08 | 3.4 |
| B10 (Comparative Example) | FeSiCrAl | 0.9 | 2.0 | 1.0E+02 | 0.3 |

The measured results of the samples B1 to B4 shown in Table 2 indicate that a high specific resistance equal to or greater than $10^8$ Ω·cm and a high withstand voltage equal to or greater than 5.0 V/μm were observed when the small particle ratio was 1.0 vol % or less and that the specific resistance and withstand voltage increased as the small particle ratio decreases. The measured results of the samples B5 and B6 demonstrate that, even when the most frequent particle size was 1.9 μm, a high specific resistance equal to or greater than $10^8$ Ω·cm and a high withstand voltage of 2.7 V/μm were observed as long as the small particle ratio was 1.0 vol % or less. The measured results of the samples B7 and B8 demonstrate that, even when the most frequent particle size was 0.3 μm, a high specific resistance equal to or greater than $10^8$ Ω·cm and a high withstand voltage of 6.2 V/μm were observed as long as the small particle ratio was 1.0 vol % or less. The measured results of the samples B9 and B10 demonstrate that, even when the composition of the metal magnetic particles contains Al, a high specific resistance equal to or greater than $10^8$ Ω·cm and a high withstand voltage of 3.4 V/μm were observed as long as the small particle ratio was 1.0 vol % or less.

The measured relative permeability of the samples A1 to A10 shown in Table 1 prove that, even when the small particle ratio drops, the relative permeability does not drop, rather slightly improves.

The above-described measured results indicate that the metal magnetic particles constituted by a Fe-based alloy and having a most frequent particle size from 0.3 μm to 1.9 μm can achieve excellent insulating properties (a high specific resistance of $10^8$ Ω·cm or greater) without causing a drop in relative permeability when the small particle ratio is 1.0 vol % or less. Reducing the small particle ratio (more specifically, to 1.0 vol % or less) results in preventing the small particles from consuming an excessive amount of oxygen. Even if the most frequent particle size of the metal magnetic particles increases, this mechanism remains true. Accordingly, it may be expected that the effects of the present embodiments, i.e., achieving excellent insulating properties without causing a drop in relative permeability, can be still realized when the metal magnetic particles have a most frequent particle size of 2 μm and are thus suitable for high frequency band application.

Next, advantageous effects of the foregoing embodiments will be described. In one or more embodiments of the present invention, since the small particles 32 account for 1 vol % or less of the metal magnetic particles contained in the magnetic base body 10 or 110, a reduced amount of oxygen is consumed by the small particles 32 when the metal magnetic particles are heated during the process of manufacturing. Accordingly, a sufficient amount of oxygen can be fed to the large particles 31. This can prevent generation of electrically conductive magnetite on the surface of the large particles 32. Thereby, the insulating properties of the magnetic base body 10, 110 can be improved.

When the metal magnetic particles are heated during the process of manufacturing the magnetic base body 10, 110, the small particles 32 having a large specific surface area are susceptible to oxidation. Therefore, on the completion of the heating treatment, the elements (for example, Fe) exhibiting magnetic properties contained in the small particles 32 are mostly oxidized, so that the small particles 32 exhibit no or little magnetic properties. To address this issue, the ratio of the small particles 32 is reduced to 1 vol % or less. As a result, the filling factor of the metal magnetic particles in the magnetic base body 10 or 110 may drop but the relative permeability does not drop when compared with the case where the small particles 32 account for 1 vol % or greater. Thereby, in one or more embodiments of the present invention, the magnetic base body 10, 110 can achieve improved insulating properties without causing degradation in permeability. In addition, the magnetic properties of the small particles 32 experience a greater change over time than those of the large particles 31. Since the small particles 32 account for 1 vol % or less of the metal magnetic particles contained in the magnetic base body 10 or 110, this means a low ratio of the particles that are to change more greatly over time in the magnetic base body 10, 110. Accordingly, the foregoing embodiments can reduce the degradation in magnetic properties of the magnetic base body 10, 110.

In one or more embodiments of the present invention, the magnetic base body 10, 110 can achieve excellent frequency characteristics since the most frequent particle size of the metal magnetic particles is 2 μm or less. The above-described samples shaped like a toroidal are taken as an example. When the most frequent particle size of the metal magnetic particles is 1.9 μm, the imaginary component of the relative permeability rises at a frequency of approximately 40 MHz. When the most frequent particle size of the metal magnetic particles is 0.9 μm, however, the imaginary component of the relative permeability rises at a higher frequency of approximately 300 MHz.

In one or more embodiments of the present invention, the oxidation of the small particles having a particle size equal to or less than 30% of the most frequent particle size can be further reduced since the Fe content in the total mass of the metal magnetic particles is less than 92 wt %. This can further contribute to prevent generation of electrically conductive magnetite on the surface of the large particles 31. In one or more embodiments of the present invention, if the Fe content in the total mass of the metal magnetic particles is equal to or greater than 80 wt %, excellent magnetic saturation characteristics can be achieved.

In one or more embodiments of the present invention, since the most frequent particle size of the metal magnetic particles is 2 μm or less, the stray capacitance can be reduced between the metal magnetic particles and the coil conductor 25, 125.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. A method for forming a magnetic base body for a coil component, the method comprising:

preparing a plurality of metal magnetic particles such that the metal magnetic particles are distributed according to a predetermined volume-based particle size distribution where a most frequent particle size ranges from 0.3 μm to 1.9 μm and a cumulative frequency of particle sizes ranging from a smallest particle size to 30% of the most frequent particle size is equal to or less than 1%; and oxidizing surfaces of the plurality of metal magnetic particles to form an insulating film on the surfaces of the plurality of metal magnetic particles, the insulating film exhibiting insulating properties and being an oxide of a metal element contained in the plurality of metal magnetic particles.

2. The method according to claim 1, wherein two adjacent ones of the plurality of metal magnetic particles are bound together via the insulating film.

3. The method according to claim 1, wherein the plurality of metal magnetic particles are made of an Fe-containing alloy.

4. The method according to claim 1, wherein the oxidizing the surfaces of the plurality of metal magnetic particles results in the insulating film containing an oxide of Si and an oxide of a metal element that is more susceptible to oxidation than Fe.

5. The method according to claim 4, wherein a total content of Si and the metal element that is more susceptible to oxidation than Fe is 8 wt % or more.

6. The method of claim 1, wherein oxidizing of the metal element contained in the plurality of metal magnetic particles to form the insulating film is performed by exposure to oxygen during formation of the magnetic base body.

7. The method of claim 4, wherein oxidizing of the metal element contained in the plurality of metal magnetic particles to form the insulating film is performed by exposure to oxygen during formation of the magnetic base body.

8. The method according to claim 7, wherein a total content of Si and the metal element that is more susceptible to oxidation than Fe is 8 wt % or more.

9. The method of claim 1, wherein the cumulative frequency of particle sizes ranging from the smallest particle size to 30% of the most frequent particle size is equal to or more than 0.1% and equal to or less than 1%.

10. The method of claim 6, wherein the cumulative frequency of particle sizes ranging from the smallest particle size to 30% of the most frequent particle size is equal to or more than 0.1% and equal to or less than 1%.

11. The method of claim 7, wherein the cumulative frequency of particle sizes ranging from the smallest particle size to 30% of the most frequent particle size is equal to or more than 0.1% and equal to or less than 1%.

12. A method for forming a coil component, the method comprising:

forming the magnetic base body according to claim 1; and providing a coil conductor on or in the formed magnetic base body.

13. The method according to claim 12, wherein the forming the coil component further comprises providing a plurality of magnetic sheets, each magnetic sheet being fabricated by producing a slurry using the plurality of provided metal magnetic particles, pouring said slurry into a mold, and applying a predetermined molding pressure to the molded slurry.

14. The method according to claim 13, further comprising stacking and bonding the plurality of magnetic sheets via thermal compression, thereby forming a body laminate.

15. The method according to claim 14, further comprising cutting the body laminate and heating the cut body laminate.

16. The method according to claim 15, wherein, after the heating, a conductive paste is applied a surface of the body laminate to form external electrodes.

* * * * *